July 21, 1964 W. J. EMMONS ETAL 3,141,581
MEANS FOR VARYING THE AMOUNT OF MATERIAL MEASURED
OUT IN DISPENSING APPARATUS
Filed June 27, 1961

INVENTORS
WILLIAM J. EMMONS
BERNARD S. GALLAGHER
BY
ATTY.

United States Patent Office 3,141,581
Patented July 21, 1964

3,141,581
MEANS FOR VARYING THE AMOUNT OF MATERIAL MEASURED OUT IN DISPENSING APPARATUS
William J. Emmons, Alameda, and Bernard S. Gallagher, Piedmont, Calif., assignors to Salter Machine Company, Alameda, Calif., a corporation of California
Filed June 27, 1961, Ser. No. 120,054
5 Claims. (Cl. 222—283)

This invention relates to machines for dispensing metered amounts of sub-divided material, and more particularly, it relates to a novel means for varying the amount of material dispensed in such machines.

Our invention is especially useful with dispensing apparatus of the type used in canneries wherein granular sodium chloride or granular calcium chloride is stored and then dispensed in measured amounts directly into each can either before or after the can has been filled with food products. Such a dispensing device now widely used in the canning industry is described in our Patent No. 2,673,006. In this machine and in similar dispensing machines the amount of material dispensed in each can is determined by the size of each one of a series of single openings located at spaced apart stations on a measuring disc in the dispenser. The components of the dispenser are so arranged that when the measuring disc is rotated the granulated material can be dispensed in the desired amount in each can as it passes through the dispenser.

In the course of canning different types of food products on the same canning line or in canning similar products having a variable salt content, or in changing the size of the can being used, the amount of salt metered into each can must be changed to meet the changed condition. In the tuna canning industry, for example, this necessity to alter the amount of salt being dispensed per can is particularly prevalent because the tuna fish in different boat loads often vary considerably in their salt content when they arrive at the cannery. This variation is due mainly to the difference in the amount of salt added by the fishermen at sea for the purpose of preserving the fish until arrival at the cannery. Thus, when each load of fish arrives at the cannery for processing, the salt content of the fish is checked and that particular load of fish must be salted to the prescribed amount during the scanning process. On a canning line being supplied with fish from many different sources it is therefore obvious that the amount of salt required to be added during canning must be changed many times during a production run so that each can of fish will have a uniform salt content despite its salt content before being canned.

In any canning operation, several factors are always extremely important. Perhaps the most essential is the element of time. Anything that causes a slowing up or stopping of the canning line cannot be tolerated in an efficient high production system. Heretofore, in order to cope with the aforementioned requirement to alter the amount of salt being metered out into each can, it was necessary to change the entire measuring disc in the salt dispenser on the scanning line to one having measuring pockets of a different size to enable the dispensing of the proper amount of salt. Thus, one problem, prior to the present invention was that of making the change in the amount of salt being dispensed at each station of the measuring disc without having to remove and replace the disc. Not only was time lost in changing the measuring disc but expensive skilled labor was required to perform the task and there was always the possibility that a disc having measuring ports of the proper size would not be available.

It is therefore one important object of our invention to provide a novel means for varying salt dispensed into each can in a canning line that is simple, efficient, and inexpensive, and one which does not require the removal and replacement of the measuring disc.

Another object of the invention is to provide a means for changing the amount of salt dispensed to each can by a means that is rapid and easy to install. Our invention provides a means for varying the salt content in each can when the line is stopped and the alteration can be performed in a very short time, of the order of seconds, without complicated and costly maintenance facilities and without the need for a highly skilled mechanic.

Another object of our invention is to provide a novel measuring disc having a group of relatively small, closely spaced pockets at each peripheral dispensing station rather than a single pocket for use in combination with a series of plugs which are inexpensive, easy to form, and expendable, for insertion in the small pockets. The plugs and pockets are so formed that a single plug can be readily inserted and retained in a pocket to decrease the amount of salt being dispensed by the group of small pockets by some fixed predetermined amount.

In attempting to solve the problem of varying the amount of salt being metered out at the various stations, it was heretofore suggested by those faced with the problem in the industry, to equip each single measuring pocket on the measuring disc with a bushing for decreasing the volume of the pocket by a predetermined amount. However, the use of bushings of metal or any other material never proved to be satisfactory. For one thing they required a skilled mechanical operation to fix them in place, and once in, they were not easily removable. A particularly serious drawback of the metal bushings was that the possibility constantly existed that one could become loosened and inadvertently fall into a can passing through the dispenser. Such an occurrence could give rise to legal complications for the canner on the basis of food contamination.

It is therefore another important object of our invention to provide a means for plugging any one of a series of holes in the measuring disc for changing the amount of salt dispensed at any one station that eliminates the danger of contamination of the contents of the can should the plugging means inadvertently fall into the can.

More specifically, an object of our invention is to provide plug members for closing one or more of a series of pockets at each dispensing station on a measuring disc that are formed from a material that will dissolve and become harmless should the plug inadvertently fall into a can.

Another object is to provide a plug member for closing off a dispensing pocket that is formed from a compressed form of the same material being dispensed.

The foregoing and other objects and advantages of the invention will become apparent from the following description of a preferred embodiment thereof as illustrated in the accompanying drawing forming a part hereof and in which.

Figure 1:
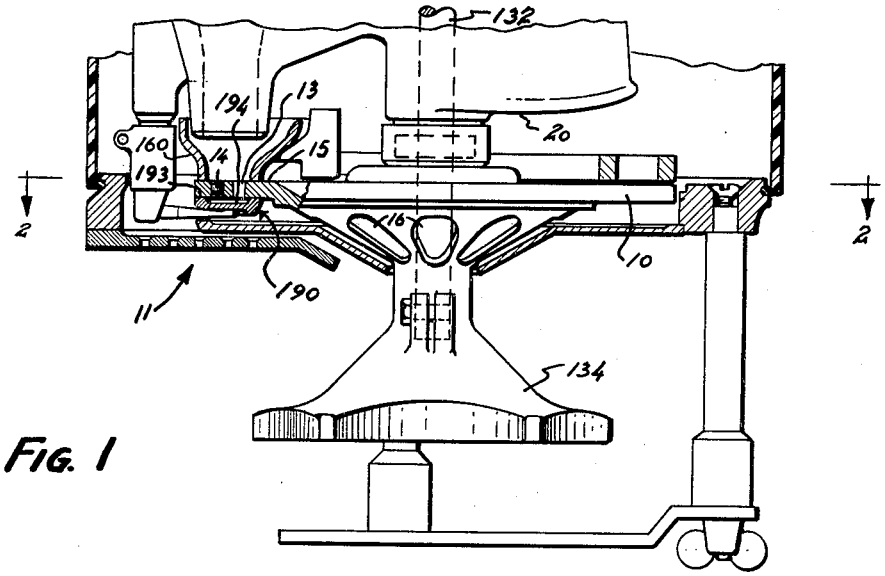
FIG. 1 is a fragmentary view in elevation and partly in section of a typical dispenser having for one of its components a measuring disc incorporating the principles of the present invention.

For purposes of illustrating and explaining the unique features of the invention, it will be described with reference to FIG. 1 which shows a dispenser measuring disc 10 incorporating features of the present invention in combination with a dispenser 11. Only a portion of the dispenser 11 is shown in FIG. 1 since such a dispenser is fully described in detail in our earlier Patent No. 2,673,-006. It is to be understood, however, that the present invention is not limited by this particular form of dispenser since it may be applied to other forms of dispensers which utilize measuring plates or discs with pockets for metering out predetermined amounts of material.

In broad terms the measuring disc 10 of the present invention is a unique departure from the measuring discs in the prior art and as shown in our earlier patent in that instead of a single dispensing pocket at each dispensing station, there is a group 12 of smaller closely spaced pockets 13 of equal size at each peripheral dispensing station. The combined area of each group of ports 13 for each station represents the maximum amount of granulated material that can be dispensed when the disc 10 in the dispenser 11 is rotated to that station. For example, when canning tuna fish that have not already attained an increased salt content, the full amount of salt is required for each can, and thus all of the pockets 13 in a group 12, being unplugged, combine to dispense the maximum amount of salt to each can during the canning process. However, if less than the maximum amount of salt is required to be dispensed, as when saltier fish are being canned, the measuring disc 10 is used in combination with a plurality of plugs 14 which are retained in one or more of the pockets 13 of each group 12 of pockets to reduce the amount of salt by some known proportion. In accordance with the principles of our invention the plugs 14 are made of a uniform size and shape and of a material that will dissolve and become harmless should any plug fall inadvertantly into a can of food. Although various substances can be used for the plugs 14, we have discovered that unique results and important advantages are obtained by making the plugs 14 from the same material as the material being dispensed, but in a compressed form.

The dispenser 11 is basically similar to that shown in our earlier Patent No. 2,673,006 and the numbers of like components as shown in the patent are retained here for sake of clarity. Thus, in FIG. 1 the measuring disc 10 of the present invention is attached to a spindle 132 supported by suitable bearings in a frame 20 of the dispenser 11. A can turret or star wheel 134 is also secured to and drives the spindle 132. The disc 10 and the turret 134 are adjustable on the spindle 132 so that they can be aligned to dump the measured material directly from the disc 10 to a can (not shown) in receiving position below. In the dispenser 11, which is illustrative only of a typical environment for the present invention, the granulated material from an upper storage bin (not shown) is gravity fed through a funnel into a spring mounted magazine 160. The function of the magazine 160 is to deposit the salt or other material into each group of pockets 13 in the measuring disc 10. The mounting of the magazine 160 is such that it imposes a minimum of friction on the disc 10. This is important because the disc is sometimes turned by a very light pressure of a can engaging the star wheel 134.

Just below the measuring disc 10 and under the magazine 160 is a shoe 190 which effects the closure of each group of pockets 13 by bearing gently against the bottom of the measuring disc 10. As in the case of the magazine 160 this pressure should be kept to a minimum. The shoe 190 comprises a segment of a ring and preferably has a depressed center 194 with a rim 193 in a plane to bear against the bottom of the measuring disc 10. The depressed center 194 will fill with salt so that the net amount measured into each pocket 13 will be the volume of the pocket. As the filled pockets 13 of each group 12 are moved off the shoe 190, the contents of the unplugged pockets fall into the can which accomplished the moving of the disc by contact with the star wheel 134.

Figure 2:
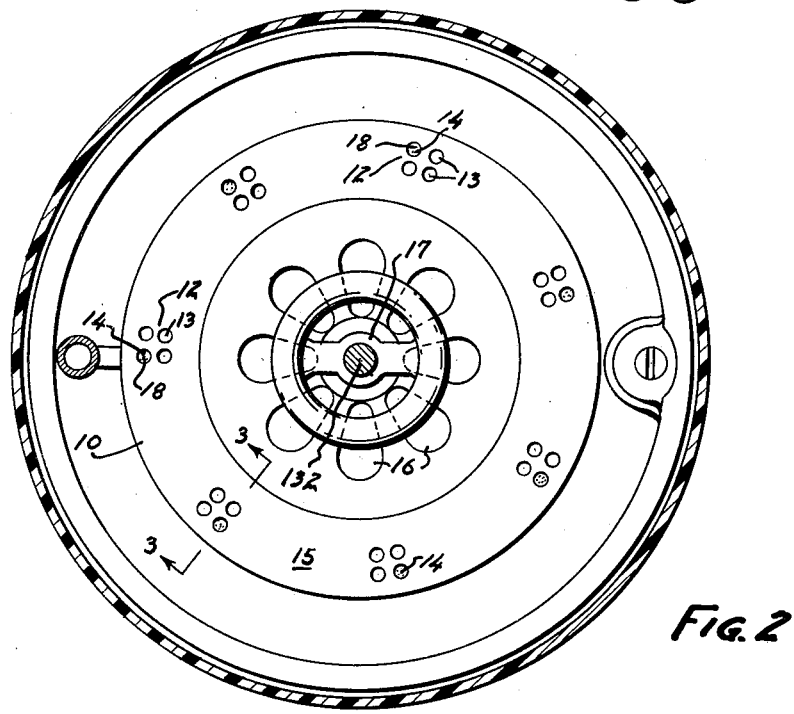
FIG. 2 is a plan view of the measuring disc shown in FIG. 1.

In accordance with the present invention, the measuring or metering disc 10, FIG. 2, includes a flat annular portion 15 on which are regularly spaced the groups 12 of closely arranged pockets 13. To facilitate cleaning of the machine the disc 10 has spokes 16 to support the annular portion 15 and connect it to a hub 17 by which the disc 10 is attached to the spindle 132. Any desired number of pockets 13 may be used in each group 12 of pockets on the measuring disc 10, the number of pockets in each group being determined by the increment of change required for the particular dispensing operation.

Figure 3:
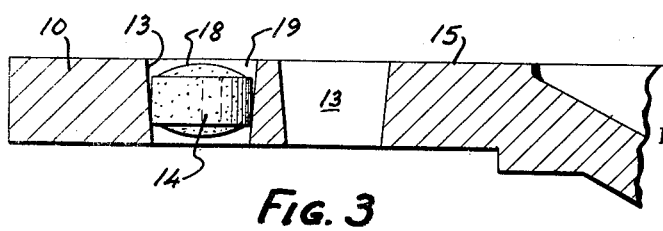
FIG. 3 is an enlarged fragmentary view in elevation and in section showing a portion of the measuring disc of FIG. 2 in section as taken along the line 3—3.

Each one of the pockets 13 is generally cylindrical in shape but preferably provided with a slight taper as shown in FIG. 3, the upper end being slightly larger in diameter. The dimensions of each pocket 13 and the plugs 14 are such that a plug 14 in place within a pocket 13 rests approximately midway between the upper and lower surfaces of the annular portion 15 of the measuring disc 10. The plugs 14 are also generally cylindrical in shape and are formed in the conventional manner by compressing the sodium chloride in a mold having the desired shape. Salt having a purity equal to that of the granulated material being dispensed can be used and it will readily compress into a solid plug without the need for admixing excipients. For convenience in forming the plugs 14 and to relieve stresses during their formation the ends 18 of each plug are convex in shape.

In operation when a plug 14 is inserted in a pocket 13 the upper convex end surface 18 of the plug is always below the surface of the disc 10, leaving a space 19, which during the dispensing operation remains filled with granulated salt. The space 19 is important because it allows a cushion that permits a slight rearrangement of the salt particles as the measuring disc 10 is moved relative to the dispenser magazine 160. With the plugs 14 having a true cylindrical shape and the pockets 13 being tapered slightly, the plugs 14, when inserted will not become frozen and can easily be moved when not needed.

The combination of our novel measuring disc 10 with its groups 12 of closely spaced ports 13 and the plugs 14 of salt material have several important advantages that have solved serious problems in the use of dispensers of the type described. First of all, the plugs, being simple in form are inexpensive to manufacture. Thus they are easy to keep in large supply in an easily accessible location. With the ports arranged in the measuring disc 10 the plugs 14 are easy to install and they can be removed readily by merely applying a small upward force through the pocket. A skilled mechanic is not required to service the dispenser 11 to alter the amount of salt being dispensed since all that is required is that a plug be inserted or removed into one or more of each pocket 13 and this can be done manually without special tools and in a short period of time. Once in, the plugs 14 are always easily visible on the measuring disc 10 so that if the proper number of plugs 14 are not in place, the correction can be quickly made.

A most important feature of the plugs 14 is that should one inadvertently slip through a pocket 13 and fall into an open can of food being canned, the plug would dissolve in the can and be rendered harmless. If rubber or metal plugs were used, the possibility would always exist of having such a plug find its way accidentally into a can of food and such an occurrence would create a serious liability for the canner. Our invention has eliminated this problem while also providing a means for rapidly and efficiently varying the amount of salt being metered from the dispenser.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a dispensing apparatus for metering out a predetermined amount of hygroscopic granulated material into each of a series of containers, means for varying the amount of material being metered out by said dispensing apparatus into each said container, said means comprising: a measuring disc having a plurality of spaced apart dispensing stations located around the axis of said disc; each said station having a plurality of bore holes of substantially equal diameter for receiving an amount of material to be dispensed, the total volume of all said bore holes at each said station comprising the maximum amount of said material which said dispenser is capable of dispensing at each said station; removable plug means for insertion in said pockets for varying the amount of said material being dispensed at each station in proportion to the number of said pockets receiving a said plug means, said plug means being formed of a compressed material that is dissolvable in the material already present in the containers and which may be added to said containers without rendering its contents unfit for human consumption.

2. The device as described in claim 1 wherein said plug means is formed of compressed salt material.

3. The device as described in claim 1 wherein each said pocket has a slight taper downwardly about a vertical axis and each said plug has a substantially cylindrical shape.

4. The device as described in claim 3 wherein each said plug has a length shorter than the depth of said pocket as defined by the thickness of said measuring disc, and a diameter slightly greater than the lower end diameter of each said pocket, whereby said plug, when situated in said pocket, forms a recessed area below the upper surface of said measuring disc.

5. A measuring disc for use in a dispensing machine adapted to supply predetermined uniform amounts of material to each of a plurality of containers moving through said dispenser, said disc comprising an annular portion having a uniform thickness and a series of spaced apart dispensing stations thereon, each said station comprising a group of closely spaced substantially cylindrical pockets of uniform size having a slight downwardly converging taper and extending completely through said annular portion, cylindrical plug means having a length less than said uniform thickness of said annular portion and retained in at least one of said pockets in each of said groups thereof, each said plug means being removable manually and formed from a non-toxic material that is dissolvable in the contents of said containers.

References Cited in the file of this patent

UNITED STATES PATENTS

| | | |
|---|---|---|
| 198,760 | Brown | Jan. 1, 1878 |
| 203,997 | Brown | May 21, 1878 |
| 1,490,365 | Du Grenier | Apr. 15, 1924 |
| 2,515,594 | Fischman | July 18, 1950 |
| 2,750,072 | Duncan | June 12, 1956 |